United States Patent [19]

Herbener et al.

[11] 4,125,250

[45] Nov. 14, 1978

[54] FLAME-CUTTING MACHINE

[75] Inventors: Klaus Herbener, Bruchköbel; Karlheinz Schmunck, Muhlheim, both of Germany

[73] Assignee: Messer Griesheim GmbH, Frankfurt am Main, Germany

[21] Appl. No.: 801,772

[22] Filed: May 31, 1977

[30] Foreign Application Priority Data

Jun. 9, 1976 [DE] Fed. Rep. of Germany ....... 2625758

[51] Int. Cl.$^2$ .............................................. B23K 7/00
[52] U.S. Cl. ...................................... 266/50; 266/902
[58] Field of Search ................................... 266/50, 902

[56] References Cited

U.S. PATENT DOCUMENTS

| 3,339,903 | 9/1967 | Reinfeld et al. | 266/50 |
| 3,704,012 | 11/1972 | Pfeuffer et al. | 266/50 |

FOREIGN PATENT DOCUMENTS 1,496,082  8/1967  France ...................................... 266/50

Primary Examiner—Howard N. Goldberg
Assistant Examiner—Paul A. Bell
Attorney, Agent, or Firm—Ernest F. Marmorek

[57] ABSTRACT

A flame-cutting machine for cutting a continuously cast rod includes a cutting torch attached to the machine for cutting the rod, a pair of clamping levers pivoted on the machine for clamping the rod, and a height-adjusting device which has a variable spacing from the rod; the cutting torch and the clamping levers are coupled to the height-adjusting device.

10 Claims, 4 Drawing Figures

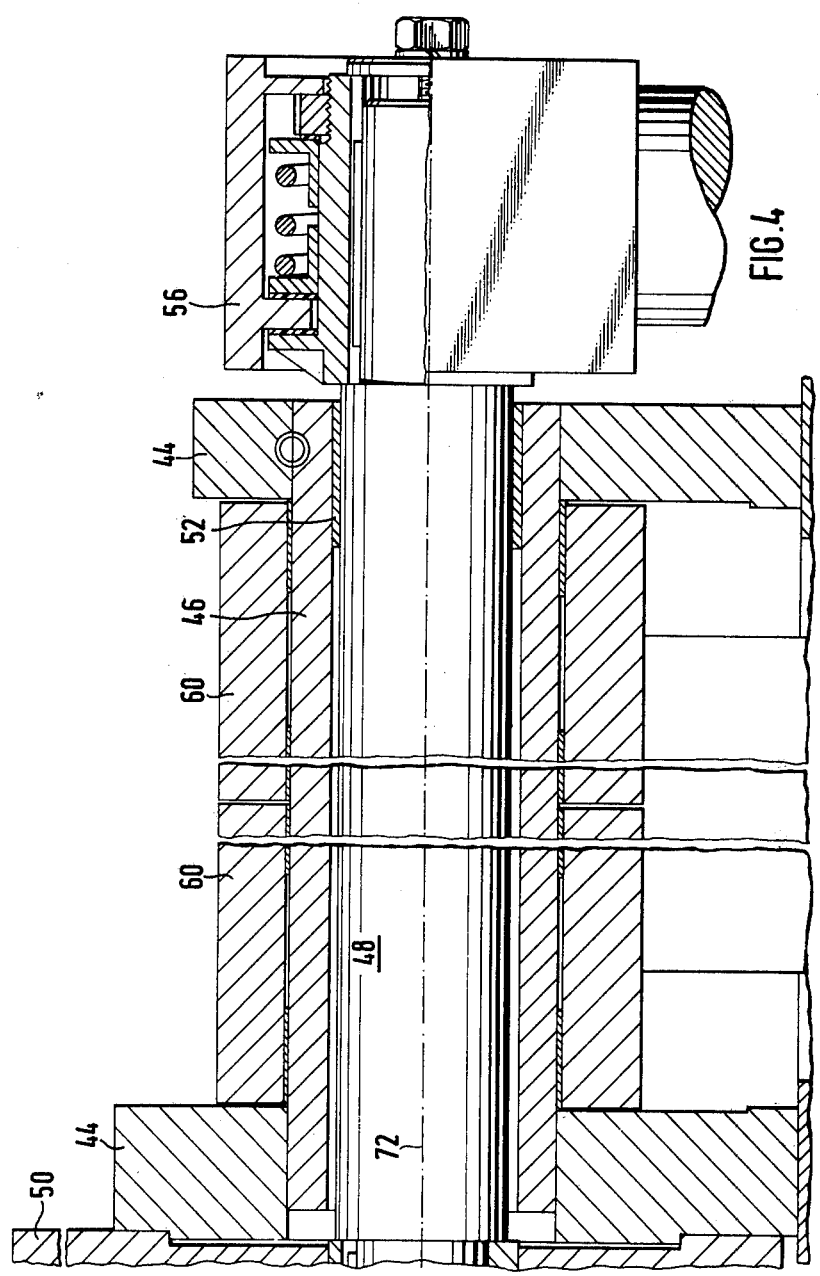

FLAME-CUTTING MACHINE

BACKGROUND OF THE INVENTION

The invention relates to a flame-cutting machine for cutting a continuously cast rod, including clamping levers clamping the machine to the rod, and a cutting torch for cutting the rod.

A flame-cutting machine of the above type is known from German Patent No. DT-PS 1,947,283. In this known machine stops are provided on the clamping jaws gripping the workpiece, so that the displacement path of the cutting torch is limited.

SUMMARY OF THE INVENTION

It is an object of the present invention to devise a flame-cutting machine which permits the cutting of rods of different sizes without any time-consuming and costly switching-over process.

This object is attained, according to the present invention, by the cutting torch and the clamping levers being coupled to a height-adjusting means.

Accordingly, a flame-cutting machine for cutting continuously cast rods, according to the present invention, includes a cutting torch attached to the machine for cutting the rod, a pair of clamping levers pivoted on the machine for clamping the rod, and height-adjusting means having a variable spacing from the rod, the cutting torch and the clamping levers being coupled to the height-adjusting means.

A pivotable drive mechanism of the flame-cutting machine has a drive shaft, the clamping levers are pivotally disposed on the drive shaft, and the cutting torch is disposed on the drive mechanism. A miter gear is preferably provided for coupling the drive shaft to the drive mechanism. It is advantageous if a hollow shaft is rigid with the machine and if the drive shaft is disposed within a hollow shaft. Additionally, a vertically adjustable sled is preferably disposed on the hollow shaft; this sled preferably includes a foot for resting on the rod, and is also preferably coupled to the height-adjusting means. The arrangement preferably includes switching elements disposed on the cutting torch and on the clamping levers, and the clamping levers are preferably movable and define a clamping-lever displacement path. It is advantageous if a follower is disposed on the clamping torch and projects into the clamping path for taking the cutting torch along to a predetermined position; a set screw is advantageously disposed on the follower for presetting the predetermined position.

By means of this arrangement, the clamping-levers can be advantageously displaced in a vertical direction, so that the clamping jaws securely grip the rod at its outer surface in dependence on the dimension or diameter of the rod to be cut. Since the cutting tool is correspondingly lifted or lowered together with the height-adjusting means, it is therefore ensured that the cutting torch is always disposed at the correct spacing from the surface of the rod, so that the proper cut can be made.

Due to the construction, according to the present invention, both the clamping-levers as well as the cutting torch, which are supported by a common shaft, can be vertically displaced by a single height-adjusting means, which may be a pneumatic or hydraulic cylinder. By this arrangement of the clamping levers and the cutting torch on a single shaft a simplified and primarily space-saving construction is attained.

By the provision of a follower on the cutting torch which projects into the clamping-lever displacement path, the cutting torch is taken along upon the clamping-levers moving towards one another into the clamping position, and therefore automatically attains the initial cutting position without requiring a separate movement, or pivoting of the cutting torch.

BRIEF DESCRIPTION OF THE DRAWINGS

For a fuller understanding of the nature and objects of the invention, reference should be had to the following detailed description, taken in connection with the accompanying drawings, in which:

FIG. 4 shows an enlargement of the support of the clamping-levers and of the clamping torch.

DESCRIPTION OF THE PREFERRED EMBODIMENTS

Figure 1:
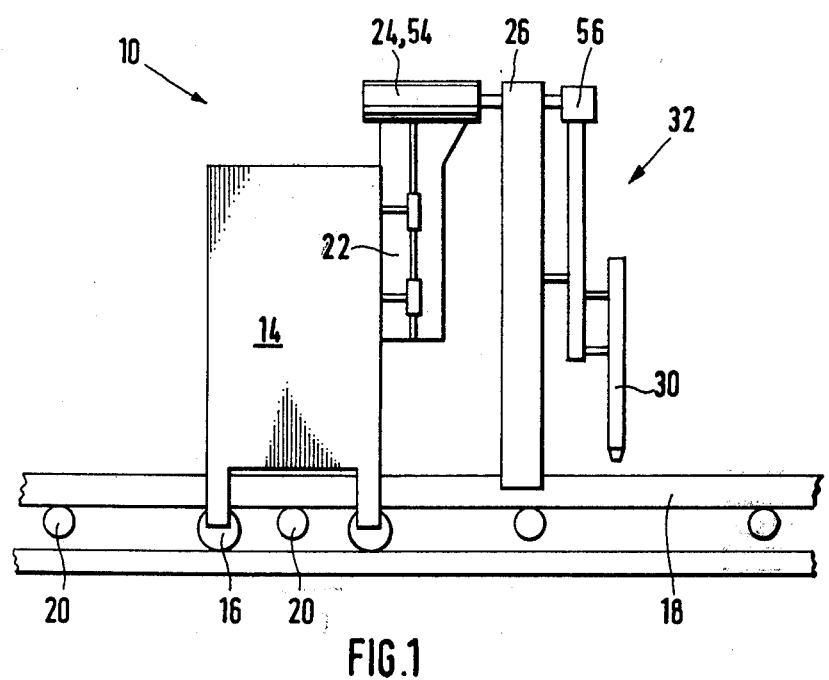
FIG. 1 shows a simplified schematic view of a flame-cutting machine, according to the present invention.

In carrying out the invention, the flame-cutting machine 10, as shown simplified in FIG. 1, consists of a carriage 14 slidable on rails 12, a rod 18 which is to be cut or separated, movable below the carriage 14, and rollers 16. The rod 18 is carried by supporting rollers 20, which latter are also disposed between the rails 12.

On the front side of the carriage 14, namely to the right, as shown in FIG. 1, there is provided a height-adjustable sled 22, on which there is disposed a pivotable drive means 24, including clamping-levers 26 and a cutting torch 30, to be described later.

Figure 2:
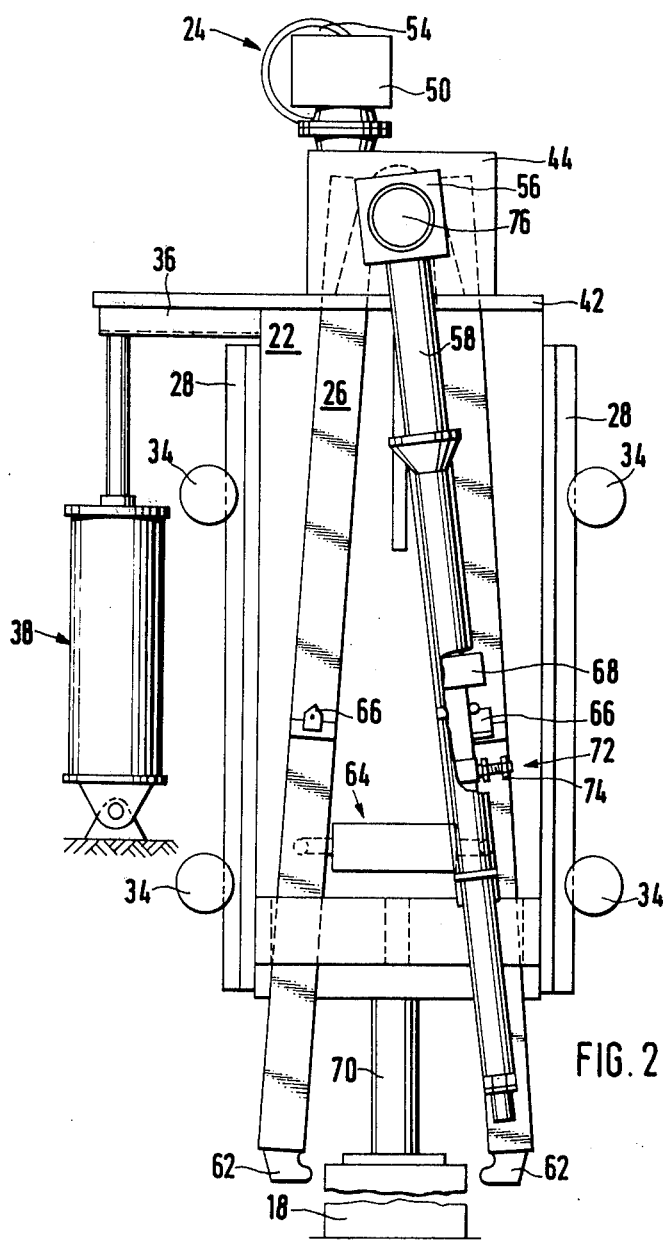
FIG. 2 shows an enlargement of the clamping-levers of the cutting torch.
Figure 3:
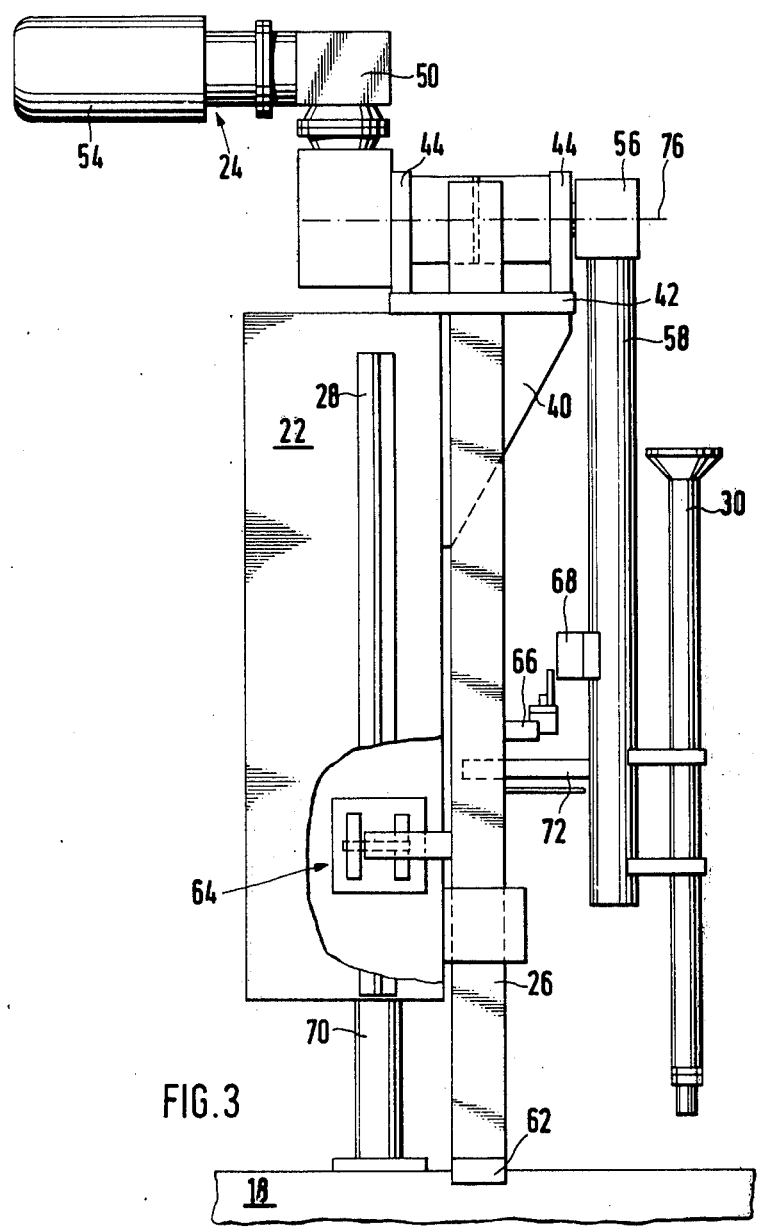
FIG. 3 is a side view, corresponding to FIG. 2.

A modular or construction unit 32, according to the present invention, which is illustrated in greater detail in FIGS. 2 and 3, is adjustable in height, and includes the clamping levers 26, and the cutting torch 30.

As is shown in FIG. 2, four rollers 34 guided in guide rails 28 serve for the vertical guidance of the sled 22 of the non-illustrated carriage 14 of the flame-cutting machine 10, the rollers 34 being rotatably disposed on the carriage 14. The sled 22 is connected through a cross beam 36 with a height-adjusting mechanism 38 disposed on the carriage 14, and is maintained by the latter at a required height. This height-adjusting mechanism includes a pneumatic or hydraulic piston/cylinder arrangement, which operates in a stepless adjustable manner, so that the sled 22 may be adjusted to an arbitrary height within the path of the sled, namely the guide rails 28.

A console 48 is associated with the upper end of the sled 22, which carries both the pivotable drive 24, as well as the modular or construction unit 32, as can be best seen from FIG. 3. A support frame 42 is attached to the console 40, a rigid hollow shaft 46 being disposed between two supporting plates 44 of the support frame 42, which arrangement is illustrated in detail in FIG. 4.

The hollow shaft 46 serves for the guidance of a drive shaft 48, which is connected with a miter gear 50 of the pivotable drive 24. The miter drive 50 is flanged to the left supporting plate 44, as shown in FIG. 4, so that it is supported indirectly by the support flange 42, and so that the drive shaft 48 is guided within the hollow shaft 46 up to the bearing 52 on its free end without in any way being loaded or stressed.

An electric motor 54 is flanged to the input side of a miter gear 50. On the free end of the drive shaft 48, and projecting from a hollow shaft 46, there is disposed as shown in FIG. 4, a slipping clutch 56, which in turn carries a tubular holder 58 for the cutting torch 30.

The hollow shaft 46 also serves, as is shown in FIG. 2, as support for the two clamping-levers 26. The clamping-levers 26 include, for this reason, so-called fork heads 60, shown in cross section in FIG. 4, which surround the hollow shaft 46, and are prevented from an axial movement by the supporting plates 44.

Since, as is shown in FIG. 4, the two fork heads 60 are pivotally disposed next to one another on the hollow shaft 46, but the clamping-levers 26 are arranged in a plane with respect to one another, the latter are displaced from one another upon being attached to the respective fork heads 60, a common pivoting plane of the clamping-levers being attained by a bend within the region of the fork heads 60. This feature, known per se, is not separately illustrated for clarity's sake.

The clamping jaws 62, which are provided at the lower respective ends of the clamping-levers 26, have arcuate clamping surfaces, so that a secure clamping of the rod 18 is ensured irrespective of the position of the clamping-levers 26, and in accordance with the dimensions of the rod 18.

In order to pivot the clamping-levers 26 towards one another, there is disposed a hydraulic or pneumatic piston/cylinder mechanism 64 between the clamping-levers 26. The cylinder is pivoted to one clamping-lever 26, while the piston rod is pivoted to the other clamping-lever 26. This permits a "freely suspended" arrangement of the mechanism 64 between the clamping-levers 26.

As can be further seen from FIGS. 2 and 3, switching members 66 are provided on the clamping-levers 26, which make contact with a final keying device 68 attached to the holder 58.

In order to position the sled 22, and therefore the clamping levers 26 as well as the cutting torch 30 with respect to the rod 18 to be cut, there is provided on the lower end of the sled 22 a foot 70, the latter resting together with the sled on the rod 18 during the flame-cutting process. The foot 70 always insures an exact spacing between the rod 18 and the clamping-levers 26 on one hand, as well as between the former and between the cutting torch, on the other hand.

As can be clearly seen from FIG. 3, there is disposed on the holder 58 a follower 72 by means of which the cutting torch 30 can be taken along into the cutting position by one of the clamping-levers 26 upon closure of the latter. By means of a set screw 74, disposed on the follower 72, as seen in FIG. 2, the timing of one of the clamping-levers 26, taking along the cutting torch 30, can be determined, and the position of the clamping torch can also be changed with respect to the cutting edge.

The flame-cutting machine operates as follows:

If the rod 18 has moved through a predetermined path between and below the machine 10, as best seen in FIG. 1, the height-adjusting mechanism 38 is switched on, and the sled is displaced in a lower direction, until its foot 70 rests on the rod 18. Simultaneously, or following a short delay, the two clamping-levers 26 are moved towards one another, and also in a direction towards the rod 18, by the piston/cylinder mechanism 64, until the clamping jaws abut the rod 18. The rod 18 is clamped with such a force, that the flame-cutting machine is taken along with the moving rod 18 without requiring a separate drive.

The foot 70 required for positioning of the machine remains generally on the rod 18 throughout the operation, since it is rigidly connected to the sled 22. It is, of course, also possible to form the foot 70 in a displaceable manner and to retract the same following positioning of the clamping-levers 26 and of the cutting torch 30.

As a result of the arcuate formation of the clamping jaws, an optimal clamping of the rod 18 by the clamping-levers 26 is insured independently of the magnitude of the rod 18 to be clamped, particularly since the clamping-levers are supported on a shaft 48 and have a joint pivoting axis, so that the clamping jaws 26 always abut the outer surface of the rod 18 tangentially.

The torch 30, moving also about the same pivoting axis, is displaced by the follower 72 upon the movement of the clamping-levers 26 towards one another in a direction towards the rod 18. At this moment in time the pivoting drive 24 has not yet been switched off, since the pivotal movement of the clamping-levers 26 is larger than the reciprocal rotation of the drive shaft 48, the cutting torch being reciprocally rotated by the latter at the cutting velocity. The slipping clutch 56, best shown in FIG. 4, enables the rapid advancement of the cutting torch into its cutting position. Before the cutting torch 30 is moved by, and jointly with one of the cutting levers 26, however, the first switching contact 66 (shown on the right in FIG. 2) comes into contact with the final key 68 provided on the holder 58, by means of which the proper cutting process for firing of, or feeding of oxygen to, the cutting torch is started by a non-illustrated timing relay.

Following clamping of the machine, and according to the adjustment of the timing relay, the pivoting drive 24 is switched on, so that the cutting torch is now moved at the cutting velocity.

Towards the end of the cutting path, the final key 68 is again activated by the left switching member 66 shown in FIG. 2. The clamping-levers 26 therefore are removed from the rod 18, the cutting torch 30 is pivotally moved back to its initial position, and the flame-cutting machine 10 again returns to its initial position from its end position, to which latter it was moved during the cutting process by its own drive, as shown in FIG. 1.

The joint pivoting of clamping levers 26, as well as of the cutting torch 30 through the same axis of the driving shaft 48 confers the advantage that an optimal cut is obtained as a result of the same displacement path. Any lateral displacement of the rod 18 from its ideal center position, according to FIG. 2, results only in the clamping levers 26 and the cutting torch 30 being moved along to such an eccentric position. A proper clamping of the rod 18, as well as a proper positioning of the cutting torch 30 into its cutting position is therefore always assured, and is independent of any deviation of the rod from its ideal center position.

Furthermore, as a result of a joint support of the clamping levers as well as of the cutting torch, the latter can be adjusted in an advantageous manner for clamping by the height-adjustable mechanism 38 at the required spacing from the rod 18, which spacing is dependent on the diameter of the rod 18.

As has been described before, the clamping process is started only following displacement of the cutting torch by means of one of the clamping-levers 26 towards the rod 18, upon switching on the pivotable drive 24. Alternatively, it is also possible, however, to switch on the pivotable drive 24 together with the start of the clamping process. In this latter case the drive shaft 48 reciprocates at a velocity which is smaller than the reciprocating velocity of the cutting torch. These two different velocities are compensated by the slipping clutch 56.

We claim:

1. A flame cutting machine for cutting a continuously cast rod extending in a predetermined direction, comprising in combination:
   - a first carriage movable in said predetermined direction,
   - a second carriage connected to said first carriage, movable therewith, and also relative thereto in a direction substantially at right angles to said predetermined direction,
   - drive means disposed on said second carriage and spaced apart from said rod,
   - a drive shaft defining a center axis coupled to said drive means and reciprocably rotatable thereby,
   - a cutting torch coupled to said drive shaft for a swinging movement about said center axis to and from a cutting position adjacent said rod,
   - a pair of clamping levers pivotably supported on said shaft and for simultaneous opposite movement about said center axis to and from a position wherein they clamp said rod temporarily during flame cutting, and
   - means operable for reciprocating said drive shaft independently of the movement of said clamping levers.

2. A flame-cutting machine according to claim 1 further comprising a hollow shaft rigid with said machine, said drive shaft being disposed within said hollow shaft, and said pair of clamping levers being pivotably supported on said hollow shaft.

3. A flame cutting machine according to claim 4, wherein the means for reciprocating said drive shaft independently of the movement of said clamping levers include two fork heads pivotably disposed next to one another on said hollow shaft, wherein said drive shaft has a free end projecting from said hollow shaft, and further comprising a slipping clutch disposed on the free end of said drive shaft, a holder secured to said slipping clutch for having said cutting torch mounted thereon, and support means for securing said hollow shaft to said second carriage.

4. A flame-cutting machine according to claim 2 further comprising a vertically adjustable sled, said hollow shaft being rigidly connected to said sled.

5. A flame-cutting machine according to claim 4, wherein said sled further comprises a foot for resting on the rod to ensure an exact spacing between said torch and said rod.

6. A flame-cutting machine according to claim 1, further comprising switching elements disposed on said cutting torch and on said clamping levers for controlling the actuation of said torch during its travel past said clamping levers.

7. A flame-cutting machine according to claim 1, further comprising a follower disposed on said cutting torch and projecting into the path of movement of said levers, one of said levers taking said cutting torch along to a predetermined position.

8. A flame-cutting machine according to claim 7, further comprising a set screw disposed on said follower for presetting said predetermined position.

9. A flame-cutting machine according to claim 1 wherein said torch is slidably coupled to said shaft.

10. A flame-cutting machine according to claim 1 wherein the clamping action of said levers is controlled by a hydraulic cylinder hinged between said levers.

* * * * *